(No Model.)
G. C. F. P. JANSSEN.
FLOUR BOLTING MACHINE.
No. 299,647. Patented June 3, 1884.
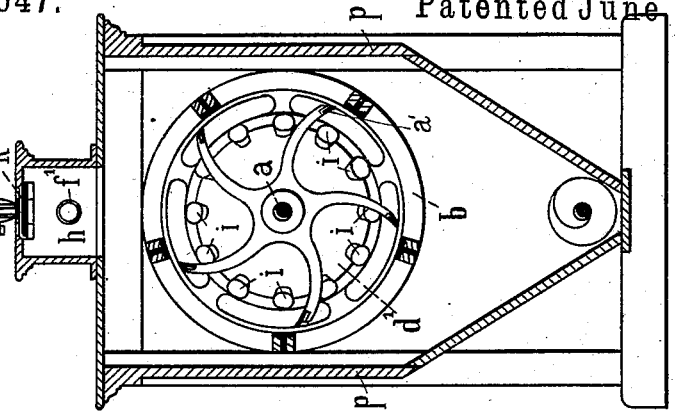
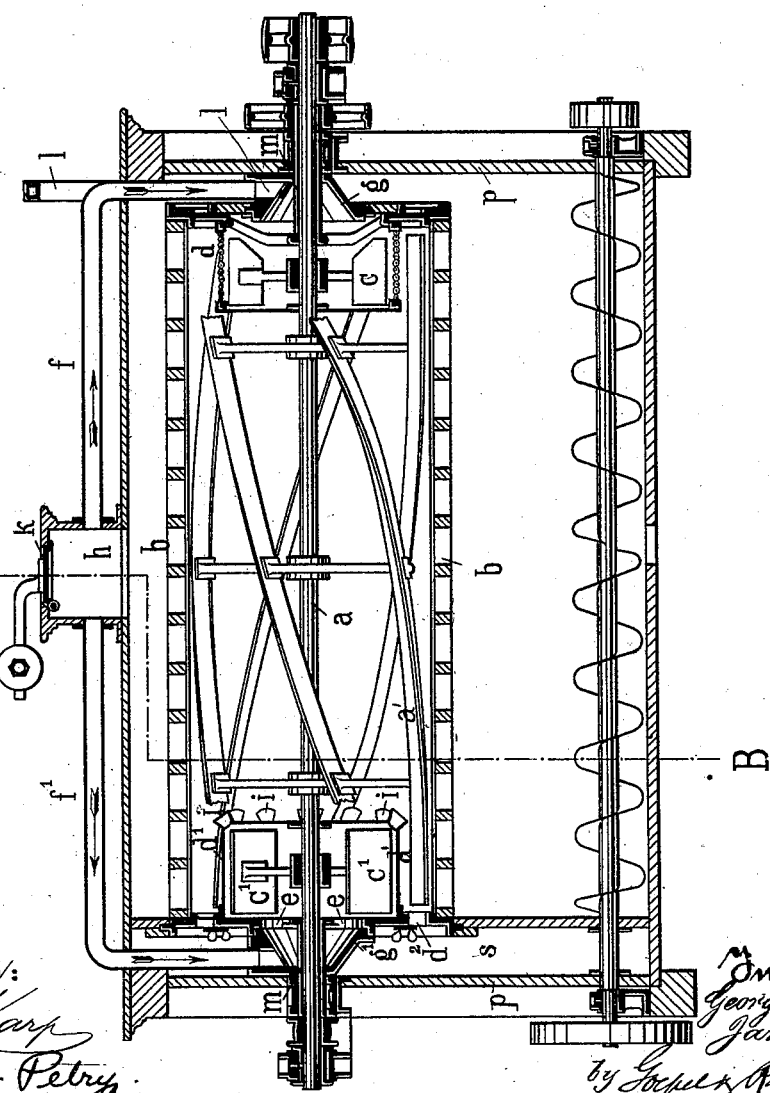
Witnesses:
Carl Karp
Martin Petry
Inventor
Georg C. F. P. Janssen
by Jacob & Regner
Attorneys

UNITED STATES PATENT OFFICE.

GEORG CARL FRIEDRICH PAUL JANSSEN, OF HAMBURG, GERMANY.

FLOUR-BOLTING MACHINE.

SPECIFICATION forming part of Letters Patent No. 299,647, dated June 3, 1884.

Application filed January 18, 1884. (No model.)

*To all whom it may concern:*

Be it known that I, GEORG CARL FRIEDRICH PAUL JANSSEN, a subject of the Emperor of Germany, and a resident of Hamburg, in the German Empire, have invented certain new and useful Improvements in Flour-Bolting Machines, of which the following is a specification.

This invention relates to improvements in machines for bolting flour and other pulverized substances, in which the air required for sifting the meal is drawn from the reel-chest inclosing the bolt and circulated through the apparatus, whereby a strong current of air can be applied without loss of material.

The invention consists of a revolving reel and interior revolving stirrers, to the shaft of which are applied suction-fans, the frames or casings of which are attached to the heads of the reel. The fan-casings communicate by funnels with air-pipes leading to the valved top of the reel-chest, and by supply-openings with the interior of the reel, whereby the circulation of the air through the reel-chest and reel is kept up.

In the accompanying drawings, Figure 1 represents a vertical longitudinal section, and Fig. 2 a vertical transverse section on line A B, Fig. 1, of my improved flour-bolting machine.

Similar letters of reference indicate corresponding parts.

In the drawings, $b$ is the bolting-reel, to the heads of which are applied hollow shafts $m$, that turn in suitable bearings at the outside of the reel-chest $p$. The meal or other pulverized substance is supplied to the inside of the reel $b$ by a pipe, $l$, which opens into a fixed funnel, $g$, at one end of the reel-chest $p$, and is agitated by spiral stirrer-blades $a'$, which are secured to a shaft, $a$, that extends through the hollow shafts $m$ of the reel to the outside of the reel-chest $p$. To the shaft $a$ are also applied, near each head of the bolting-reel $b$, fans or ventilators $c\ c'$. The fan $c$ rotates in a wire basket, $d$, while the other fan, $c'$, is surrounded by a casing, $d'$, the basket $d$ and casing $d'$ being attached, respectively, to the heads of the reel $b$. The casing $d'$ is open at that side adjoining the head of the reel, and communicates by openings $e\ e$ in said head with a fixed funnel, $g'$, which is connected by an air-pipe, $f'$, with a chamber, $h$, at the top of the reel-chest $p$. The inner wall of the casing $d'$ is provided with a number of short air-pipes, $i$, through which the air is forced into the bolting-reel $b$. At the opposite head of the reel $b$ is also arranged a fixed funnel, $g$, that extends around the hollow shaft $m$ of the reel, and communicates with an air-pipe, $f$, which latter communicates also with the chamber $h$ at the top of the reel-chest $p$. The chamber $h$ communicates by its open bottom part with the interior of the reel-chest $p$, and is closed at its top by a hinged and weighted self-regulating air-inlet valve, $k$, which admits air to the interior of the reel-chest $p$ from the outside whenever, in case of obstruction, no air should be drawn through the pipes $f\ f'$. The fans $c\ c'$ draw the air from the reel-chest $p$ into the top chamber, $h$, and through the pipes $f\ f'$ and funnels $g\ g'$, and force it into the reel $b$, where it acts upon the meal or other substances to be sifted and accelerates their passage through the bolting-cloth of the reel. The bolted flour collects at the bottom of the reel-chest, and is discharged therefrom by a spiral conveyer. The coarser substances pass through openings $d^2$ in one head of the reel to a chamber, $s$, at one end of the reel-chest $p$, and are conducted off from the same. When a sufficiently large fan can be arranged at one end of the reel, the fan at the other end of the reel and its connecting air-pipe may be dispensed with. The sifting action of the bolting-machine is accelerated by the action of the fans and by the continuous circulation of air which is kept up by the same through the bolting-reel and reel-chest.

Having thus described my invention, I claim as new and desire to secure by Letters Patent—

1. The combination, in a flour-bolting machine, of a revolving bolting-reel, an inclosing reel-chest, a chamber at the top of the reel-chest, interior fan-casings attached to the head of the reel, fans secured to the stirrer-shaft, fixed funnels at both ends of the reel, and air-pipes connecting the same with the chamber at the top of the reel-chest, substantially as described.

2. In a machine for bolting flour, the combination of a reel-chest, $p$, a revolving reel, $b$, having fan-casings $d\ d'$ attached to its heads, fans $c\ c'$, attached to the stirrer-shaft $a$, funnels $g\ g'$, connecting air-pipes $f\ f'$, a chamber, $h$, located in the top of the reel-chest, and a valve, $k$, substantially as described.

In testimony that I claim the foregoing as my invention I have signed my name, in presence of two witnesses, this 24th day of November, 1883.

GEORG CARL FRIEDRICH PAUL JANSSEN.

Witnesses:
ALEXANDER SPECHT,
EMIL HAASE.